United States Patent [19]
Akins et al.

[11] Patent Number: 5,623,280
[45] Date of Patent: Apr. 22, 1997

[54] FLEXIBLE LIQUID CRYSTAL DISPLAY WITH TOUCH SENSITIVE SCREENS

[75] Inventors: Robert B. Akins, Coral Springs; Robert Pennisi, Boca Raton; Joaquin Barreto, Coral Springs, all of Fla.

[73] Assignee: Motorola, Inc., Schaumburg, Ill.

[21] Appl. No.: 538,170

[22] Filed: Aug. 23, 1995

Related U.S. Application Data

[63] Continuation of Ser. No. 262,128, Jun. 17, 1994, abandoned.
[51] Int. Cl.⁶ .................................................. G09G 3/36
[52] U.S. Cl. .................................... 345/104; 345/87
[58] Field of Search ............................... 345/104, 102, 345/87, 173; 200/5 A

[56] References Cited

U.S. PATENT DOCUMENTS

| | | | |
|---|---|---|---|
| 4,024,368 | 5/1977 | Shattuck | 200/5 A |
| 4,743,895 | 5/1988 | Alexander. | |
| 4,789,858 | 12/1988 | Fergason et al. | 345/104 |
| 5,221,979 | 6/1993 | Kim | 345/87 |

*Primary Examiner*—Curtis Kuntz
*Assistant Examiner*—Vivian Chang
*Attorney, Agent, or Firm*—Kenneth M. Massaroni

[57] ABSTRACT

A touch sensitive liquid crystal display device (70) having first, second, and third substrates, (40), (76) and (90) and a plurality of raised ribs members (46), (48), (50), (42) and (44) to maintain appropriate spacing between said substrates. Electrically conductive material is disposed on one or more surfaces of the substrates in order to effect a change in the optical characteristics of a liquid crystal material (100) disposed between said second and third substrates.

5 Claims, 2 Drawing Sheets

FLEXIBLE LIQUID CRYSTAL DISPLAY WITH TOUCH SENSITIVE SCREENS

This is a File Wrapper Continuation of U.S. Ser. No. 08/262,128 filed Jun. 17, 1994 in the name of Akins, et al and assigned to Motorola, Inc., now abandoned.

TECHNICAL FIELD

This invention relates in general to liquid crystal display devices and more particularly to touch-sensitive liquid crystal display devices having flexible substrates.

BACKGROUND

Liquid crystal display devices (LCD's) contain liquid crystal material operatively disposed between a pair of substantially planar substrates. The facing surfaces of the substrates are typically coated with a continuous layer of a transparent conductive material which serves as an electrode. One may create optical changes in the liquid crystal material by applying a voltage to selected portions of the facing electrodes. Substrates upon which the transparent conductive material is disposed is typically a high quality glass material such as Corning 7059 Glass. However, glass substrates suffer from inherent limitations. For example, glass is relatively heavy and fragile. Accordingly, glass places significant constraints upon the manufacturing process. Moreover, since glass is relatively heavy, automated fabrication machines must be built in order to accommodate the relatively heavy weight of the glass substrates.

An additional limitation to conventional glass substrates is the need for spacer bars or rods to be disposed between the facing substrates in order to assure uniform spacing between the substrates. These rods or bars are typically added to the layer of liquid crystal material disposed between the substrates. Problems inherent in the placing of the rods and bars include obscuring of the optical changes effected by the liquid crystal material. Further, the rods and bars can deleteriously effect the layer of conductive material. Moreover, there is no uniform way to disperse rods and bars in the liquid crystal material, resulting in localized heavy and light concentrations of rods and bars. Accordingly, it is difficult to assure uniform spacing between the substrates.

Recent activity has aimed at fabricating LCD's with plastic substrates. Plastic substrates are attractive as they are thinner, lighter and less susceptible to breakage than their glass counterparts. Moreover, plastic substrates lend themselves more readily to manufacturing processes. As a result, plastic substrates may also lead to higher quality, low cost displays which are more readily adaptable to different applications.

In the context of LCD's having touch-sensitive assemblies fixed thereto, heretofore it has been the practice to affix the touch sensitive panel to the front panel of the liquid crystal display. More typically, the LCD and the touch sensitive panel have been two discreet devices which have been laminated one on top of the other. As displays have heretofore been manufactured with rigid glass substrates, the touch sensitive panel is laminated on the surface of the LCD disposed closer to the viewer. This of course raises several problems. For example, the touch sensitive screen must be substantially transparent so to not adversely impact the brightness and contrast of the underlying display. Transparency depends both upon the inherent transparency of the touch panel as well as on the method by which the panel is mounted or bonded on to the display. As LCD's were typically manufactured of glass substrates, the touch panel could not be mounted on the bottom as glass is substantially rigid and will not deform under applied pressure.

Accordingly, there exists a need for a liquid crystal display device which uses lightweight flexible substrates, and which is readily integrated into a touch sensitive system. Such a device should be preferably made of a material which eliminates the need for spacer rods or bars, and which lends flexibility to the overall device structure.

DETAILED DESCRIPTION OF THE PREFERRED EMBODIMENT

Figure 1:
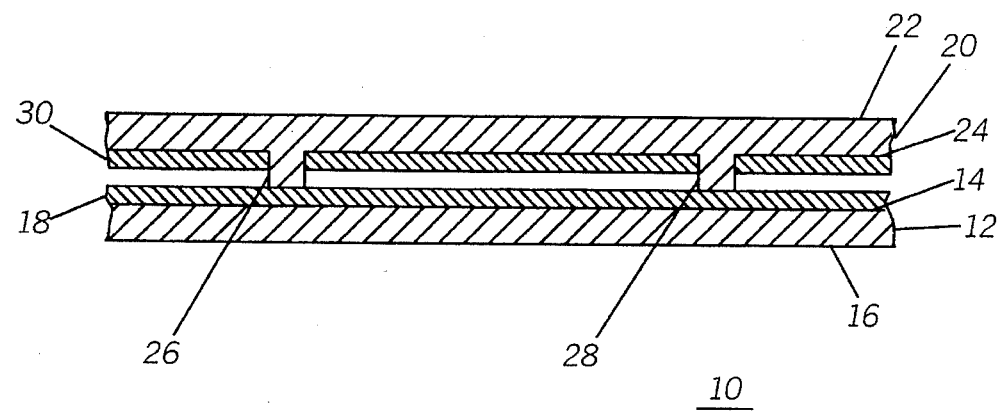
FIG. 1 is a cross-sectional side view of a touch sensitive device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a touch sensitive device in accordance with the instant invention. The touch sensitive device (10) includes a first substrate (12) having first major surface (14) and a second major surface (16). Disposed on the first major surface (14) is a layer of transparent conductive material (18). The transparent conductive material may be indium tin oxide or such other transparent conductive material as is known in the art. Alternatively, it may be a layer of non-transparent conductive material, such as a disposed layer of, for example, silver or copper.

Disposed opposite substrate (12) is a second substrate (20). The second substrate (20) has a first major surface (22) and a second major surface (24). Substrates (12) and (20) may both be fabricated of lightweight, flexible polymeric materials such as those described hereinbelow with respect to FIG. 2. Alternatively, one may be fabricated of a rigid material such as glass. Formed into the surface of the second major surface (24) is a plurality of raised ridge members, (26) and (28). The raised ridge members are formed of the same material as is substrate (20). The height and dimensions of ribs (26) and (28) may be dictated by the needs of a particular touch screen application. Accordingly, in situations in which relatively light amounts of pressure would be applied to surface (22), the ribs (26) and (28) would be relatively small so as to allow for contact between a layer of transparent conductive material (30) disposed on the second major surface (24) of the second substrate (20) and the layer transparent conductive material (18) on the second surface (14) of substrate (12). Alternatively, if a heavy force is being applied to surface (22) the size and width dimensions of ribs (26) and (28) may be considerably larger.

The ribs (26) and (28) are provided to strengthen and ruggedize the device (10) partially for use in harsh environments. By providing ribs (26) and (28), substrates (20) and (12) are not permanently deformed or otherwise damaged by the repeated applications of touches to surface (22) of substrate (20).

The operation of device (10) is intended to allow a device such as a microcontroller (not shown) to determine the location of a touch point on the surface (22) of device (10). Touch points are effected when a user presses a surface (22) of substrate (20), deforming the substrate (20) downward until layer (30) makes contact with layer (18). Since substrate (20) is fabricated of a flexible material, it may be repeatedly deformed without damage. Electrical current is passed through one of the conductive layers. Hence, when conductive layer (30) makes electrical contact with conductive layer (18), it essentially closes a switch between the two conductive layers. The location of this touch point can then be determined by a microcontroller in a manner well known in the art.

Figure 2:
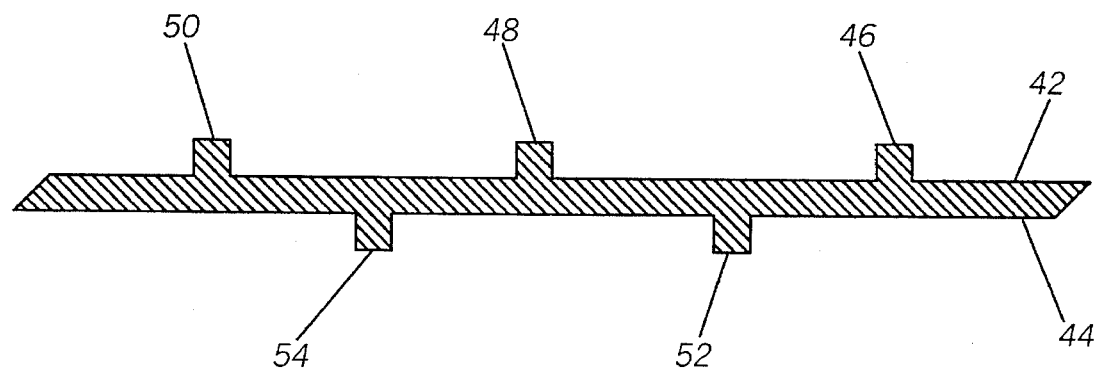
FIG. 2 is a cross-sectional side view of a ribbed substrate for a liquid crystal display device in accordance with the invention.

Referring now to FIG. 2, there is illustrated therein a substrate for use in a touch sensitive liquid crystal display in accordance with the instant invention. Substrate (40) has a first major surface (42) and a second major surface (44). Formed on the first surface (42) is a plurality of raised ribs members (46), (48), and (50), formed of the same material as the substrate (40). Formed on the second major surface (44) is a second plurality of raised ridge members (52) and (54). The height and dimensions of the ribs (46), (48), (50), (42), and (44) are dictated by the needs of the particular display application.

The substrate (40) may be fabricated of a flexible polymeric material. Examples of preferred substrate polymeric materials include extruded thermoplastic films such as polyester, mylar, Kapton, polyethylene, tperaphalate, polyether ether ketones, polyether (ULTEM®), polyvinylidene fluoride (KYNAR®), and combinations thereof. It is to be understood, however, that other polymeric substrates, optically anisotropic or otherwise, may be used without departing from the spirit or scope of the invention.

It is to be noted in FIG. 2 that while the first surface is illustrated as having a three raised rib members, and the second surface (44) is illustrated as having two raised rib members, the number of such raised rib members may be substantially greater and may be determined based upon a particular size and/or application for the substrate. Further, while the raised rib members are depicted as being substantially square, they may be some other shape, such as hemispherical, or any other regular or irregular shape.

Figure 3:
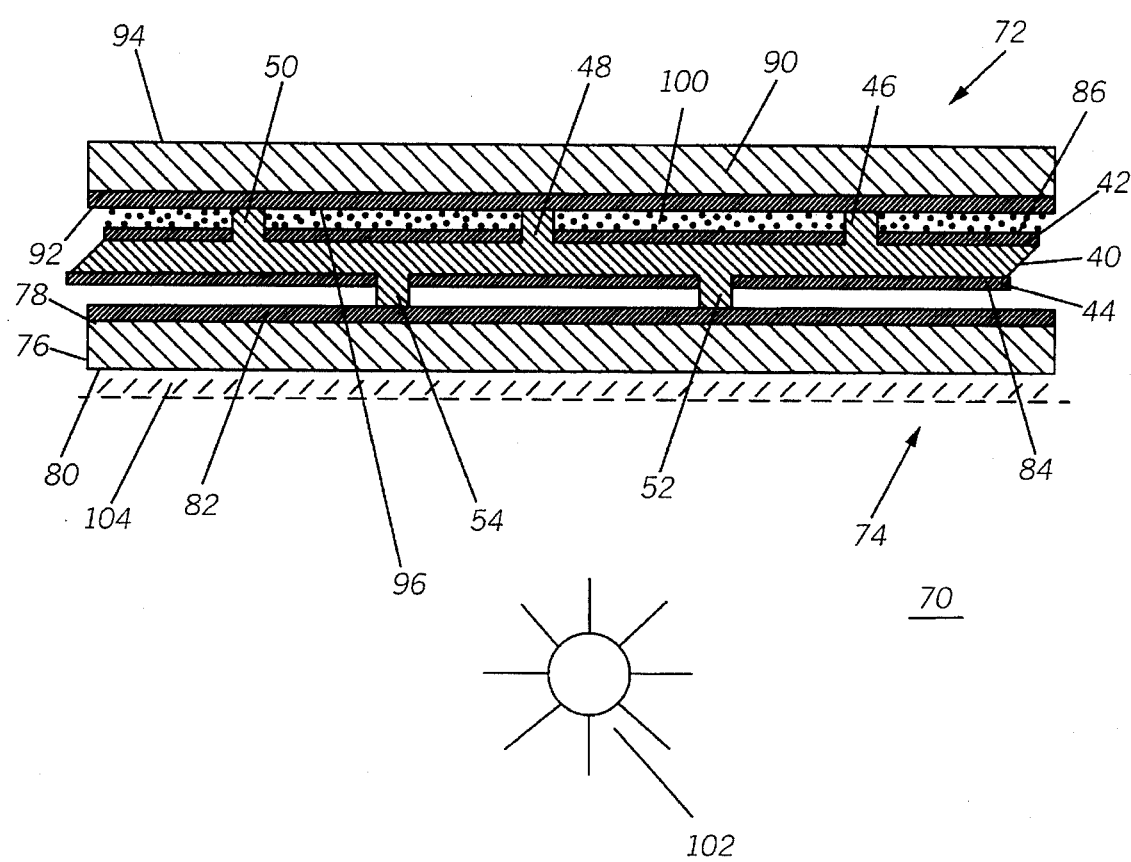
FIG. 3 is a cross-sectional side view of a liquid crystal display device with touch sensitive surface in accordance with invention.

Referring now to FIG. 3, there is illustrated therein a liquid crystal display device having a touch sensitive panel disposed thereon. The device (70) includes a viewer proximal (72) and viewer distal (74) side. The display (70) further includes a first substrate (76) having a first major surface (78) and a second major surface (80). The first substrate (76) may be fabricated of the same materials as described hereinabove with respect to FIG. 2. Alternatively, the first substrate may be a rigid substrate and may be fabricated of, for example, high quality glass.

Operatively disposed on the first surface (78) of substrate (76) is a layer of electrically conductive material (82). The layer (82) may be fabricated of a conductive metal such as silver, copper or other conductive metals known in the art, or alternatively may be a transparent conductive material such as indium tin oxide. The layer of conductive material may be deposited by any of a number of techniques known in the art.

The liquid crystal display device (70) further includes a second substrate (40) such as that described hereinabove with respect to FIG. 2. Operatively disposed on the second major surface(44) of substrate (40) is a layer of electrically conductive material such as that described hereinabove with respect to substrate (76). The layer of electrically conducted material (84) is disposed in the regions between and around rib members (52) and (54).

Substrates (40) and (76) are then arranged in substantially parallel, spaced relationship so that the layers of electrically conductive material (82) and (84) are in an opposed, facing relationship. Rib members (52) and (54) of substrate (40) abut substrate (76) assuring uniform spacing between said substrates.

Operatively disposed on the first major surface (42) of substrate (40) is a layer of conductive material (86). The layer of electrically conductive material (86) is disposed on surface (42) in the areas between and around the raised ridge members (46), (48) and (50). The transparent conductive material is the same as that described hereinabove with respect to layers (84) and (82).

The display device (70) further comprises a third substrate (90) fabricated of a flexible polymeric material such as that described hereinabove with respect to substrate (40). Substrate (90) further includes a first and second major surface (92) and (94). Disposed on first major surface (92) is a layer of transparent electrically conductive material (96) such as that described hereinabove with respect to layers (82), (84), and (86). Substrate (90) is disposed in spaced, parallel, facing relationship with substrate (40) so that layers (96) and (86) are in opposite relation to one another. Rib members (46), (48) and (50) abut substrate (90) assuring uniform spacing between substrates (40) and (90).

Operatively disposed between substrates (40) and (90) is a layer of liquid crystal material (100). The liquid crystal material is selected from the group of liquid crystal material consisting of polymer-dispersed liquid crystal materials, cholesteric gels, twisted nematic liquid crystals, super twisted nematic liquid crystals, and combinations thereof. The distance between substrates (40) and (90) is typically in the range of between 5 and 20 micrometers while the distance between substrates (76) and (40) is typically in the range of 1 and 10 micrometers.

The display described hereinabove is mechanically more robust than the prior art wherein the spacer beads and rods were used to assure appropriate spacing between the display substrates. As described herein, spacing is assured by the use of the raised ridge members which are integrally formed with substrate (40). As the assembly is illustrated in FIG. 3, it is further arranged so that the second major surface (94) of substrate (90) is the viewer proximal side (72) of the assembly. Accordingly, should a viewer wish to enter information via the touch screen he is able to do so simply by pressing on the display. Pressure on the display would be transmitted through the display to the touch panel beneath it. This eliminates the requirement that the touch panel have high optical transmission. In fact, the touch panel could be completely opaque. Bonding and lamination techniques or adhesives do not have to be optically clear.

The display (70) may further include a source of light (102), operatively disposed on the viewed distal side (74) thereof. Such a light source would be necessary in the embodiment where the display panel is a transmissive display panel. Alternatively, the display (70) may include a layer of reflective material (104) (in phantom) operatively disposed on the surface (80) of substrate (76). In another embodiment, the layer of reflection material (104) may be disposed on surface (42) of substrate (40), under layer (86).

While the preferred embodiments of the invention have been illustrated and described, it will be clear that the invention is not so limited. Numerous modifications., changes, variations, substitutions and equivalents will occur to those skilled in the art without departing from the spirit and scope of the present invention as defined by the appended claims.

What is claimed is:

1. A touch sensitive liquid crystal display device having a viewer proximal side and a viewer distal side, said device comprising:

a first substrate having first and second surfaces, and having a layer of electrically conductive material disposed on the first surface thereof, said second surface comprising the viewer distal side of said device;

a second substrate having first and second surfaces and formed of a flexible polymeric material, said second substrate further including a plurality of raised ridge members formed on both said first and said second surfaces, and having a layer of electrically conductive material on both of said surfaces in the areas between said raised ridge members, said first surface of said first substrate being arranged in spaced, parallel, facing relationship with the first surface of said second substrate;

a third substrate having first and second surface and formed of a flexible polymeric material, and having a layer of electrically conductive material disposed on the first side thereof, said first surface of said third substrate being arranged in spaced, parallel, facing relationship with the second surface of said second substrate, and said second surface of said third substrate comprising the viewer proximal side of said device; and a layer of twisted nematic liquid crystal material disposed between said second and third substrates.

2. A display device as in claim 1, further including a layer of reflective material disposed on said second surface of said second substrate.

3. A display device as in claim 1, wherein said electrically conductive material is a transparent electrically conductive material, and wherein said display devices further includes a light source disposed on the viewer distal side thereof.

4. A display device as in claim 1, wherein said space between said first and second substrates is between 1 and 10 micrometers.

5. A display device as in claim 1, wherein said space between said second and third substrate is between 5 and 20 micrometers.

* * * * *